(12) United States Patent
Lee et al.

(10) Patent No.: US 8,201,102 B2
(45) Date of Patent: Jun. 12, 2012

(54) OPAQUE VIEWS FOR GRAPHICAL USER INTERFACES

(75) Inventors: Jeffery Theodore Lee, Sunnyvale, CA (US); Szu-Wen Huang, Fremont, CA (US); Jesse William Boettcher, San Jose, CA (US)

(73) Assignee: Apple Inc., Cupertino, CA (US)

( * ) Notice: Subject to any disclaimer, the term of this patent is extended or adjusted under 35 U.S.C. 154(b) by 993 days.

(21) Appl. No.: 11/899,145

(22) Filed: Sep. 4, 2007

(65) Prior Publication Data

US 2009/0064013 A1    Mar. 5, 2009

(51) Int. Cl.
*G06F 3/048* (2006.01)

(52) U.S. Cl. ........ 715/806; 715/807; 715/768; 715/781; 345/629; 345/631

(58) Field of Classification Search .................. 715/764, 715/806, 807, 766, 768, 781, 790, 792, 794; 345/421, 619, 629, 630, 631
See application file for complete search history.

(56) References Cited

U.S. PATENT DOCUMENTS

| | | | |
|---|---|---|---|
| 4,985,854 A * | 1/1991 | Wittenburg | 345/421 |
| 5,216,413 A * | 6/1993 | Seiler et al. | 715/797 |
| 5,379,057 A | 1/1995 | Clough et al. | |
| 5,487,145 A * | 1/1996 | Marsh et al. | 345/501 |
| 5,546,518 A * | 8/1996 | Blossom et al. | 345/473 |
| 5,574,836 A * | 11/1996 | Broemmelsiek | 345/427 |
| 5,675,362 A | 10/1997 | Clough et al. | |
| 5,864,342 A * | 1/1999 | Kajiya et al. | 345/418 |
| 5,892,521 A * | 4/1999 | Blossom et al. | 345/501 |
| 6,005,582 A * | 12/1999 | Gabriel et al. | 345/586 |
| 6,049,339 A * | 4/2000 | Schiller et al. | 345/630 |
| 6,069,633 A * | 5/2000 | Apparao et al. | 345/421 |
| 6,072,501 A * | 6/2000 | Bier | 345/629 |
| 6,268,859 B1 * | 7/2001 | Andresen et al. | 345/421 |
| 6,369,830 B1 * | 4/2002 | Brunner et al. | 345/629 |
| 6,476,807 B1 * | 11/2002 | Duluk et al. | 345/421 |
| 6,747,649 B1 * | 6/2004 | Sanz-Pastor et al. | 345/428 |
| 7,106,275 B2 | 9/2006 | Brunner et al. | |
| 7,292,255 B2 * | 11/2007 | Doan et al. | 345/629 |
| 7,362,339 B2 * | 4/2008 | Honme | 345/629 |
| 7,714,865 B2 * | 5/2010 | Faggion | 345/441 |
| 7,839,419 B2 * | 11/2010 | Hanggie et al. | 345/619 |
| 2003/0184554 A1 * | 10/2003 | Nakahara | 345/581 |
| 2005/0052455 A1 * | 3/2005 | Long et al. | 345/422 |
| 2006/0066621 A1 * | 3/2006 | Herceg et al. | 345/501 |
| 2006/0203011 A1 * | 9/2006 | Kobayashi | 345/629 |
| 2007/0070088 A1 * | 3/2007 | Oishi | 345/629 |
| 2008/0055623 A1 * | 3/2008 | Piersol et al. | 358/1.13 |

* cited by examiner

*Primary Examiner* — Weilun Lo
*Assistant Examiner* — Rashedul Hassan
(74) *Attorney, Agent, or Firm* — Fletcher Yoder PC

(57) ABSTRACT

A system and method of rendering a graphical user interface for a media based device which employs techniques for layering graphical elements. The method includes providing a background layer for the graphical user interface and graphical layers over the background layer. The method also superimposing an opaque view over a portion of the translucent graphic layer and marking the opaque view as opaque so that the portion of the translucent layer is not redrawn when the content in the opaque view is altered.

24 Claims, 3 Drawing Sheets

OPAQUE VIEWS FOR GRAPHICAL USER INTERFACES

TECHNICAL FIELD

The present invention relates generally to graphical user interfaces for electronic devices and, more particularly, to a system and method for efficiently rendering and displaying objects of the graphical user interfaces.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Portable electronic devices, such as mp3 players, cellular phones, portable video devices and personal data organizers, for example, are continually providing more features, functions and/or storage capacity despite the fact that the devices are decreasing in size and becoming more portable. Many of these devices are able to achieve the increase in functionality and decreased size thanks to engineering breakthroughs with respect to integrated circuits which make up the electronic devices. Specifically, the integrated circuits are able to be more densely populated with the circuits that operate in the electronic device. Additionally, more efficient techniques for utilizing existing and/or future hardware and software are being developed to allow for increased functionality.

The graphical user interface ("GUI") of portable electronic devices may be one particular area in which improved efficiency may result in great gains in productivity. Generally, the GUI is designed to provide information and display media content to a user of the electronic devices. As such, it is desirable that the GUI be aesthetically pleasing. However, to achieve a sufficiently aesthetically pleasing appearance, a non-trivial amount of the available resources of electronic devices is dedicated to the GUI. Improved efficiency of the GUI can, therefore, result in increased performance of the electronic devices.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

In accordance with one embodiment, there is provided a method for rendering a graphical user interface comprising providing a background layer and a translucent graphics layer over a portion of the background layer. An opaque view is superimposed over a portion of the translucent graphics layer. The method further comprises marking the opaque view as opaque so that a portion of the translucent graphics layer under the opaque view is not redrawn when content in the opaque view is altered.

In accordance with another embodiment, there is provided a portable electronic device comprising a display configured to display a graphical user interface and a processor configured to generate the graphical user interface. The processor generates the graphical user interface by superimposing a plurality of graphic layers over a background layer. The processor marks an opaque view as opaque so that underlying portions of the translucent layer and the background are not redrawn.

In accordance with yet another embodiment, there is provided a tangible machine readable medium comprising code configured to generate a graphical user interface comprising multiple layers and views superimposed over a background layer, wherein at least one of the views is opaque. The code is also configured to mark the opaque view as opaque so that portions of the multiple layers and the background layer superimposed by the opaque view are not redrawn when the opaque view changes.

Additionally, in accordance with yet another embodiment, there is provided a method for marking opaque views in a graphical user interface. The method comprises providing a graphical interface for an electronic device, wherein the graphical interface includes graphics layers superimposed over a background layer. The graphical user interface is subdivided into tiles based on pixels sharing common attributes. Opaque tiles are then determined and portions of layers under the opaque tiles are not redrawn if the opaque tile is redrawn.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One common model for rendering a graphical user interface ("GUI") is the superimposition of one or more layers containing different content over one or more backgrounds to achieve a final image. Although the simplicity in this approach is appealing, it may present inefficiencies related to the processing of the multiple layers. In particular, there may be portions of superimposed layers which completely cover portions of underlying layers. Additionally, in some instances, only a particular view of a top-most layer is changed while the rest of the displayed GUI remains unaltered. Even though portions of the underlying layers are obscured or remain unaltered, the traditional techniques redraw some or all of the unaltered underlying layers before finally drawing the new top-most layer. Such redrawing of obscured portions of the layers wastes processing bandwidth and results in decreased performance of the portable electronic devices.

To optimize the performance of electronic devices, a system and method for increasing the efficiency of a display system for computing devices are provided. In particular, as will be discussed in greater detail below, techniques are provided which reduce the amount of processing required to display the GUI by marking opaque views so that portions of layers under the opaque views are not redrawn.

To facilitate understanding of the following description, the following definitions are provided for several terms used herein. For the purposes of this disclosure, therefore, a "view" is a basic user interface element, such as a single- or multi-line, progress bar, bitmap, power status indicator or list. Views have common properties such as: model from which data is queried, property ID data, position, width, height, background color, etc. A "template" is a collection of user interface elements or views with predefined properties meant to be reused by different screens. A "screen" is a collection of templates. Screens can override select properties of views within a template to customize the template for a particular use.

Figure 1:
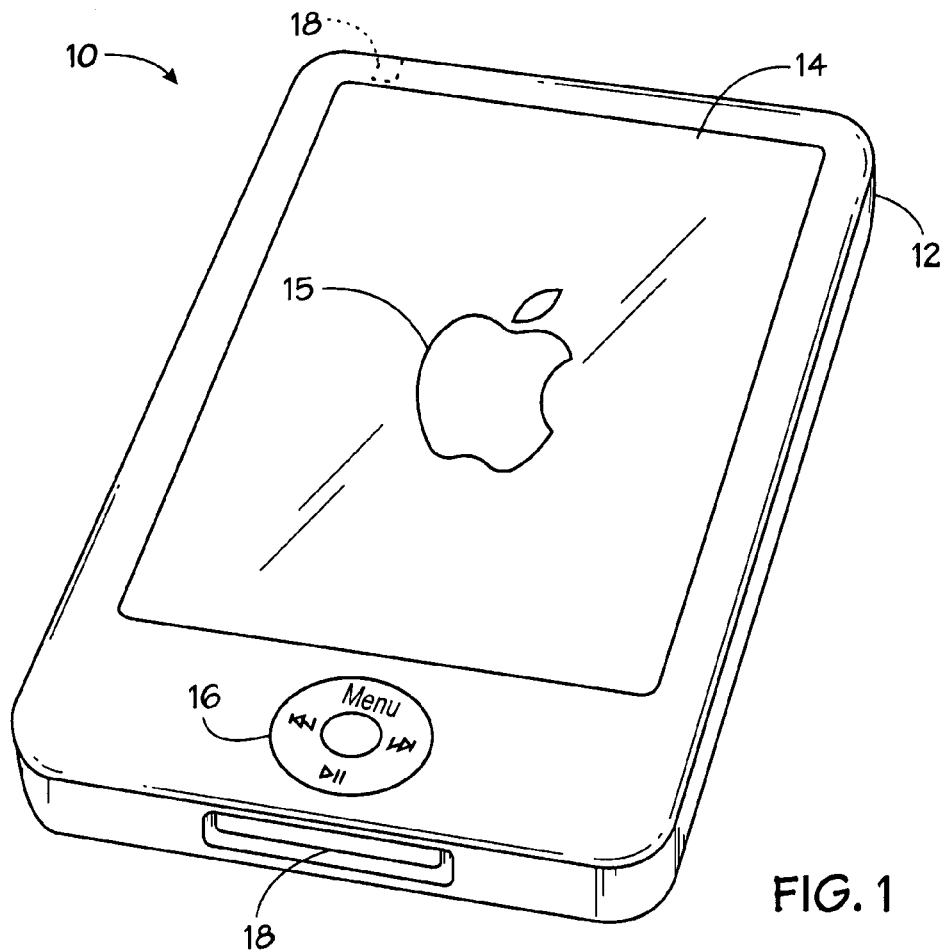
FIG. 1 is a perspective view illustrating an example of an electronic device, such as a portable media player, in accordance with one embodiment of the present invention.

Turning now to the figures, FIG. 1 depicts an electronic device 10 in accordance with one embodiment of the present invention. In some embodiments, the electronic device 10 may be a media player for playing music and/or video, a cellular phone, a personal data organizer, or any combination thereof. Thus, the electronic device 10 may be a unified device providing any one of or a combination of the functionality of a media player, a cellular phone, a personal data organizer, and so forth. In addition, the electronic device 10 may allow a user to connect to and communicate through the Internet or through other networks, such as local or wide area networks. For example, the electronic device 10 may allow a user to communicate using e-mail, text messaging, instant messaging, or using other forms of electronic communication. By way of example, the electronic device 10 may be a model of an iPod® having a display screen or an iPhone® available from Apple, Inc.

In certain embodiments the electronic device 10 may be powered by a rechargeable or replaceable battery. Such battery-powered implementations may be highly portable, allowing a user to carry the electronic device 10 while traveling, working, exercising, and so forth. In this manner, a user of the electronic device 10, depending on the functionalities provided by the electronic device 10, may listen to music, play games or video, record video or take pictures, place and take telephone calls, communicate with others, control other devices (e.g., the device 10 may include remote control and/or Bluetooth functionality, for example), and so forth while moving freely with the device 10. In addition, in certain embodiments the device 10 may be sized such that it fits relatively easily into a pocket or hand of the user. In such embodiments, the device 10 is relatively small and easily handled and utilized by its user and thus may be taken practically anywhere the user travels. While the present discussion and examples described herein generally reference an electronic device 10 which is portable, such as that depicted in FIG. 1, it should be understood that the techniques discussed herein may be applicable to any electronic device having a display, regardless of the portability of the device.

In the depicted embodiment, the electronic device 10 includes an enclosure 12, a display 14, user input structures 16, and input/output connectors 18. The enclosure 12 may be formed from plastic, metal, composite materials, or other suitable materials or any combination thereof. The enclosure 12 may protect the interior components of the electronic device 10 from physical damage, and may also shield the interior components from electromagnetic interference (EMI).

The display 14 may be a liquid crystal display (LCD) or may be a light emitting diode (LED) based display, an organic light emitting diode (OLED) based display, or other suitable display. In accordance with certain embodiments of the present technique, the display 14 may display a user interface as well as various images 15, such as logos, avatars, photos, album art, and so forth. Additionally, in one embodiment the display 14 may be a touch screen through which a user may interact with the user interface. The display 14 may also display various function and/or system indicators to provide feedback to a user, such as power status, call status, memory status, etc. These indicators may be in incorporated into the user interface displayed on the display 14.

In one embodiment, one or more of the user input structures 16 are configured to control the device 10, such as by controlling a mode of operation, an output level, an output type, etc. For instance, the user input structures 16 may include a button to turn the device 10 on or off. In general, embodiments of the electronic device 10 may include any number of user input structures 16, including buttons, switches, a control pad, keys, knobs, a scroll wheel, or any other suitable input structures. The input structures 16 may work with a user interface displayed on the device 10 to control functions of the device 10 or of other devices connected to or used by the device 10. For example, the user input structures 16 may allow a user to navigate a displayed user interface or to return such a displayed user interface to a default or home screen.

The electronic device 10 may also include various input and output ports 18 to allow connection of additional devices. For example, a port 18 may be a headphone jack that provides for connection of headphones. Additionally, a port 18 may have both input/output capabilities to provide for connection of a headset (e.g. a headphone and microphone combination). Embodiments of the present invention may include any number of input and/or output ports, including headphone and headset jacks, universal serial bus (USB) ports, Firewire or IEEE-1394 ports, and AC and/or DC power connectors. Further, the device 10 may use the input and output ports to connect to and send or receive data with any other device, such as other portable electronic devices, personal computers, printers, etc. For example, in one embodiment the electronic device 10 may connect to a personal computer via a Firewire or IEEE-1394 connection to send and receive data files, such as media files.

Figure 2:
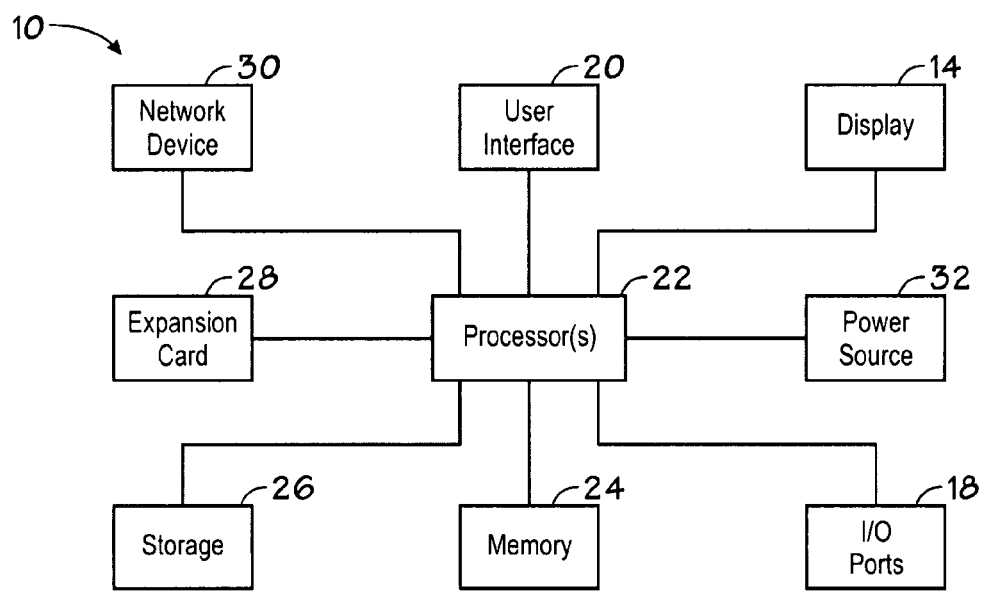
FIG. 2 is a simplified block diagram of the electronic device of FIG. 1 in accordance with one embodiment of the present invention.

Turning now to FIG. 2, a block diagram of components of an illustrative electronic device 10 is shown. The block diagram includes the display 14 and I/O ports 18 discussed above. In addition, the block diagram illustrates the user interface 20, one or more processors 22, a memory 24, storage 26, card interface(s) 28, networking device 30, and power source 32.

As discussed herein, in certain embodiments the user interface 20 may be displayed on the display 14, and may provide a means for a user to interact with the electronic device 10. The user interface may be a textual user interface, a graphical user interface (GUI), or any combination thereof, and may include various layers, windows, screens, templates, elements or other components that may be displayed in all of or areas of the display 14.

The user interface 20 may, in certain embodiments, allow a user to interface with displayed interface elements via the one or more user input structures 16 and/or via a touch sensitive implementation of the display 14. In such embodiments, the user interface provides interactive functionality, allowing a user to select, by touch screen or other input structure, from among options displayed on the display 14. Thus the user can operate the device 10 by appropriate interaction with the user interface 20.

The processor(s) 22 may provide the processing capability required to execute the operating system, programs, user interface 20, and any other functions of the device 10. The processor(s) 22 may include one or more microprocessors, such as one or more "general-purpose" microprocessors, a combination of general and special purpose microprocessors, and/or ASICS. For example, the processor(s) 22 may include one or more reduced instruction set (RISC) processors, such as a RISC processor manufactured by Samsung, as well as graphics processors, video processors, and/or related chip sets.

Embodiments of the electronic device 10 may also include a memory 24. The memory 24 may include a volatile memory, such as RAM, and a non-volatile memory, such as ROM. The memory 24 may store a variety of information and may be used for a variety of purposes. For example, the memory 24 may store the firmware for the device 10, such as an operating system for the device 10 and/or any other programs or executable code necessary for the device 10 to function. In addition, the memory 24 may be used for buffering or caching during operation of the device 10.

The device 10 in FIG. 2 may also include non-volatile storage 26, such as ROM, flash memory, a hard drive, any other suitable optical, magnetic, or solid-state storage medium, or a combination thereof. The storage 26 may store data files such as media (e.g., music and video files), software (e.g., for implementing functions on device 10), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that maintains a record of podcasts or television shows or other media a user subscribes to), telephone information (e.g., telephone numbers), and any other suitable data.

The embodiment in FIG. 2 also includes one or more card slots 28. The card slots 28 may receive expansion cards that may be used to add functionality to the device 10, such as additional memory, I/O functionality, or networking capability. The expansion card may connect to the device 10 through any type of connector and may be accessed internally or externally to the enclosure 12. For example, in one embodiment the card may be a flash memory card, such as a SecureDigital (SD) card, mini- or microSD, CompactFlash card, Multimedia card (MMC), etc. Additionally, in some embodiments a card slot 28 may receive a Subscriber Identity Module (SIM) card, for use with an embodiment of the electronic device 10 that provides mobile phone capability.

The device 10 depicted in FIG. 2 also includes a network device 30, such as a network controller or a network interface card (NIC). In one embodiment, the network device 30 may be a wireless NIC providing wireless connectivity over any 802.11 standard or any other suitable wireless networking standard. The network device 30 may allow the device 10 to communicate over a network, such as a LAN, WAN, MAN, or the Internet. Further, the device 10 may connect to and send or receive data with any device on the network, such as other portable electronic devices, personal computers, printers, etc. For example, in one embodiment, the electronic device 10 may connect to a personal computer via the network device 30 to send and receive data files, such as media files. Alternatively, in some embodiments the electronic device may not include a network device 30. In such an embodiment, a NIC may be added into card slot 28 to provide similar networking capability as described above.

The device 10 may also include or be connected to a power source 32. In one embodiment, the power source 32 may be a battery, such as a Li-Ion battery. In such embodiments, the battery may be rechargeable, removable, and/or attached to other components of the device 10. Additionally, in certain embodiments the power source 32 may be an external power source, such as a connection to AC power and the device 10 may be connected to the power source 32 via the I/O ports 18.

As mentioned above, the present techniques provide for optimization of a GUI which may be displayed on the display 14. One common technique for rendering the GUI for portable electronic devices, such as electronic device 10, includes superimposing multiple layers over a background layer wherein each layer may contain unique views that include text, graphics, images, or other elements of the displayed GUI. The technique of superimposing layers to form the displayed GUI is commonly referred to as a "painter's algorithm."

The various layers and the particular views used in generating the GUI may be rendered by software operating on the processor(s) 22, by the hardware, or by a combination of both. A more detailed description of rendering the GUI using software and/or hardware may be found in the patent applications entitled "Dynamically Reconfigurable Graphics Layer for User Interface System and Method" by Szu-Wen Huang, Jesse Boettcher and Gokhan Avkarogullari, and "List Item Layouts for a User Interface System and Method" by Szu-Wen Huang, Jesse Boettcher and Jeffery Lee, both of which are hereby incorporated by reference. Additionally, the patent application entitled "User Interface Elements Cloning and Transitions," by Jesse Boettcher, Peter Rosse and David Rempel is hereby incorporated by reference.

The various views and the layers may be defined by a location within the GUI where the view is to be displayed and an opacity, which indicates whether a view is opaque or translucent. If a layer is translucent, the opacity indicates the degree to which underlying layers may be seen through the layer. In particular, for example, if a particular layer is translucent, layers underlying the layer may show through to varying degrees depending on the opacity value of the layer. Accordingly, to determine the content ultimately displayed when translucent layers are stacked, algorithms to combine the pixel attributes of the layers, such as Alpha Blending algorithms, for example, have been developed. Additionally, U.S. Pat. No. 7,106,275 entitled, "Rendering Translucent Layers in a Display System," discusses several such algorithms, and is incorporated herein by reference.

In contrast to the translucent layers, an opaque view does not allow the underlying layer(s) to show though the view. As such, in accordance with the present techniques, when an opaque view is the top-most layer, only the attributes of the opaque view are rendered and attributes of the layers underneath the opaque view may be ignored. Examples of possible opaque views may include icons, certain graphics, pictures, videos and other similar content which may be undesirably distorted when combined with content of an underlying background layer.

As mentioned above, traditional techniques require the redrawing of the underling translucent layers. To address this concern, in accordance with the present techniques, portions of layers and views which lie underneath an opaque view will not be redrawn when the opaque view is redrawn. Additionally, obscured views will not be redrawn even if there is a change in the obscured view. For example, if a text view is completely obscured by a superimposed bitmap (opaque view), when the text of the text view is changed, no drawing occurs because it will not be seen through the opaque bitmap. Similarly, when the bitmap (opaque view) changes, the underlying text view does not need to be redrawn for the same reason.

Figure 3:
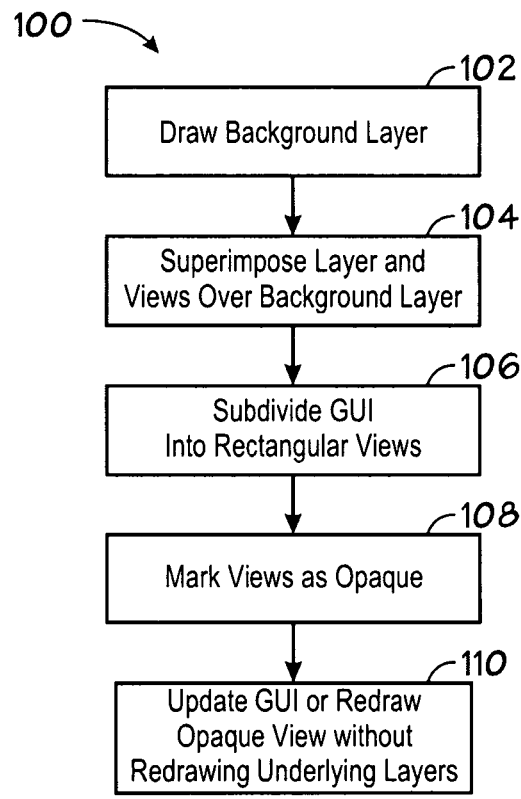
FIG. 3 is flowchart illustrating a technique for increasing the efficiency of rendering a graphical user interface by marking layers as opaque in accordance with an exemplary embodiment of the present invention.
Figure 4:
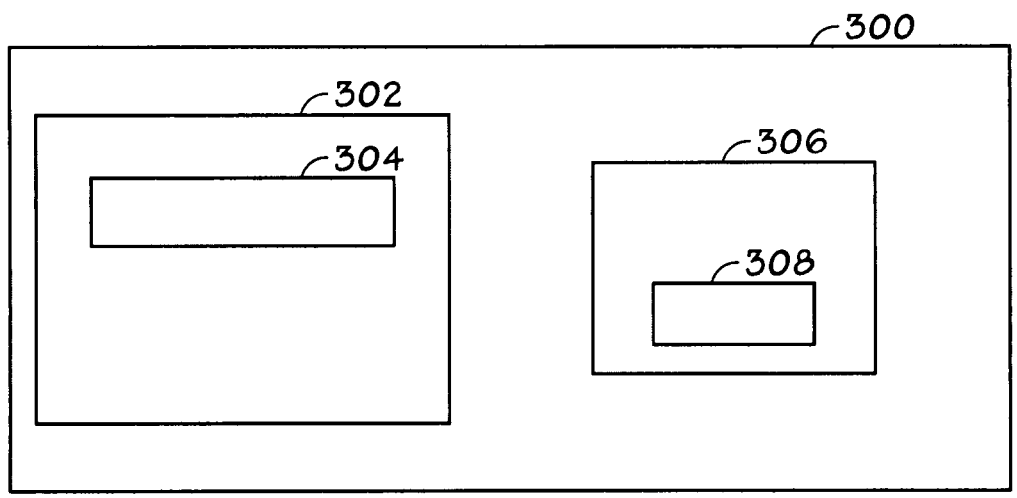
FIG. 4 illustrates layers that may be displayed on a graphical user interface in accordance with an exemplary embodiment of the present invention.
Figure 5:
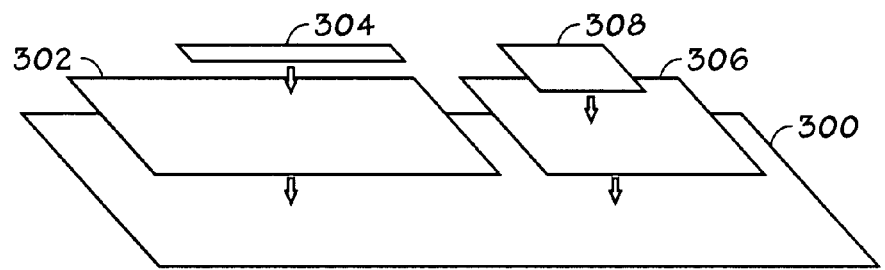
FIG. 5 illustrates a perspective view of the graphical user interface of FIG. 4 illustrating the various layers.

Turning to FIG. 3, one example of such a technique for rendering a GUI is illustrated in flowchart 100. As discussed above, in a painter's algorithm, a background layer is initially drawn, as indicated at block 102. FIG. 4 illustrates a background layer 300 as being part of an example template for a GUI in accordance with an exemplary embodiment of the present invention. FIG. 5 illustrates a perspective view of the GUI template of FIG. 4 so that the various layers may more easily be seen.

The background layer 300 may metaphorically be considered a canvas for text, media and other content presented by the GUI since once the background layer 300 is drawn, graphics layers and views may be superimposed or drawn over the background layer 300, as indicated at block 104 of FIG. 3. For example, as illustrated in FIGS. 4 and 5, a menu layer 302 may be provided over the background layer 300 and may generally be located on the left hand side of the template. A text view 304 may be superimposed on the menu layer 302 and may provide attribute information, such as font, style, size, etc, for the content of the layer, such as a menu items, play lists, contact information, etc, for example. Additionally, a graphics layer 306 may be provided which contains content for the right-hand side of the template. Additionally, an opaque view 308 may be superimposed over the graphics layer 306.

Figure 6:
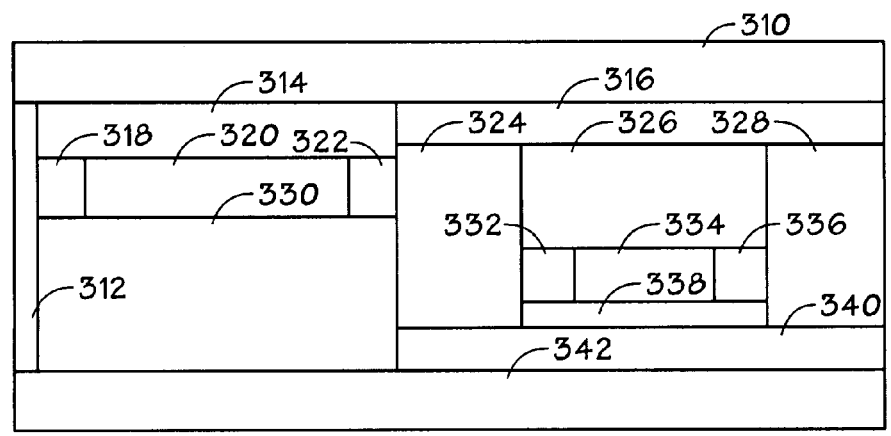
FIG. 6 illustrates the subdivision of the graphical user interface into rectangular views or tiles in accordance with an exemplary embodiment of the present invention.

Referring again to FIG. 3, once all the layers are drawn for the GUI, the GUI is subdivided into rectangular views, as indicated in block 106. FIG. 6 illustrates the subdivision of the GUI into views or tiles 310, 312, 314, 316, 318, 320, 322, 324, 326, 328, 330, 332, 334, 336, 338, 340 and 342. The tiles 310, 312, 314, 316, 318, 320, 322, 324, 326, 328, 330, 332, 334, 336, 338, 340 and 342 are divided so that each pixel within a particular tile contains the same stack of layers. As mentioned above, therefore, the pixels within a particular views or tile have common properties such as: model from which data is queried, property ID data, position, width, height, background color, etc. For example, pixels within tile 310 only display the background layer 300, whereas pixels within tile 314 include pixels for the background layer 300 as well as the menu layer 302, and pixels within tile 320 include the background layer 300, the menu layer 302, and the text view 304. Alternative tile subdivision techniques may be performed to produce similar results. In this way, the determinations as to the pixel attributes may be performed on a tile or view basis, simplifying the processing required and increasing the performance of the system by reducing the decisions made by the processor 22 in rendering the GUI.

After subdivision of the GUI into rectangular tiles, the opaque views are marked, as indicated at block 108 of FIG. 3. The determination as to which views are opaque may be made based upon global opacity values, which are assigned to the various views. As discussed above, when a view is marked as being opaque, none of the content of underlying layers or views is displayed in the opaque view. As such, as indicated at block 110 the GUI may be updated, refreshed or redrawn without redrawing the portions of the underlying layers.

Figure 7:
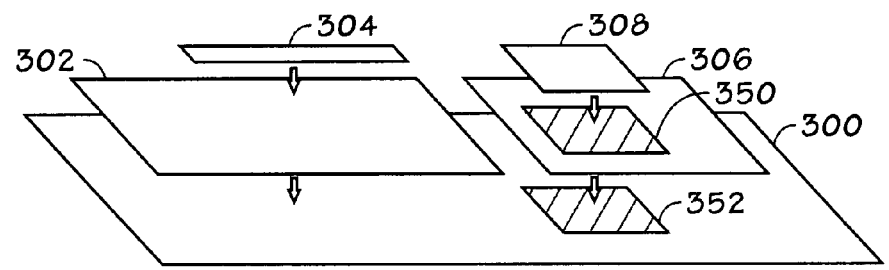
FIG. 7 is a perspective view of the graphical user interface of FIG. 4 illustrating portions of layers underlying an opaque view.

Referring to FIG. 7, portions of underlying layers which may be obscured if view 308 is marked as opaque are shown. In particular, a portion 350 of the graphics layer 306 and a portion 352 of the background layer 302 are obscured by the opaque view 308. As such, when the view 308 is changed, the portions 350 and 352 would not be redrawn. Additionally, should changes occur in either the background layer 302 or the graphics layer 306 the portions 350 and 352 would not be redrawn.

For example, as mentioned above, the opaque view 308 may be marked as opaque and may display content such as a picture or other content which does not allow the underlying layers to show through. In accordance with one embodiment, the electronic device 10 may be configured to play audio content and the content of the opaque view 308 may include album art or artist photos corresponding to the audio content currently playing on the electronic device 10. The opaque view 308 may be configured to change according to changes in the audio content, i.e. a song change, or according to input from a user.

The changing of the content of the opaque view 308 may occur by transitioning displayed content to new content having the same size as the displayed content. For example, the displayed content may transition by fading out as new content fades in. Alternative transitioning modes may also be employed and are know to those skilled in the art. In transitioning the opaque view 308 to another opaque view in this manner, the underlying layers do not change or need to be altered. In particular, the portion 350 of the graphic layer 306 and the portion 352 of the background layer 300 do not change and are not redrawn even though the opaque view 308 changes. Because the opaque view 308 has been marked as opaque, in accordance with the present techniques, the rendering system recognizes that the underlying portions are hidden and will only redraw or replace opaque view 308, leaving the portions 350 and 352 alone. Additionally, because the opaque view 308 has been marked as opaque, portions 350 and 352 of the graphic layer 306 and background layer 300 will similarly not be redrawn even when the background layer 300 or graphic layer 306 are redrawn.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for rendering in response to one refresh event a graphical user interface that includes an opaque view at a location of the graphical user interface comprising:
    drawing a background layer at least at the location during the refresh event;
    drawing a translucent graphics layer over a portion of the background layer at least at the location during the refresh event;
    drawing the opaque view over a portion of the translucent graphics layer at least at the location during the refresh event; and
    marking the opaque view as opaque so that the portion of the translucent graphics layer at the location is not redrawn when content in the opaque view is altered.

2. The method of claim 1 comprising subdividing the graphical user interface into rectangular tiles, wherein unique tiles are defined by pixels having common layers and views.

3. The method of claim 1, wherein an area of the background layer is not redrawn when content in the opaque view is altered.

4. The method of claim 1 comprising transitioning the opaque view from a first graphic to a second graphic.

5. The method of claim 1, wherein drawing the opaque view comprises providing a picture.

6. The method of claim 1, wherein drawing the opaque view comprises providing a video.

7. A portable electronic device comprising:
    a display configured to display a graphical user interface that includes an opaque view; and
    a processor configured to generate the graphical user interface in response to one refresh event by superimposing a plurality of graphic layers over a background layer by drawing the background layer before drawing the plurality of graphic layers over the background layer during the refresh event, wherein at least one of the plurality of graphic layers comprises the opaque view and portions of the plurality of graphic layers under the opaque view are not redrawn when the opaque view is redrawn.

8. The portable electronic device of claim 7, wherein the portable electronic device is configured to output audio content and the opaque view is redrawn in response to a change in the audio content being output.

9. The portable electronic device of claim 7 comprising a user interface to allow a user to provide input to the device.

10. The portable electronic device of claim 9, wherein the user interface is integrated into the graphical user interface.

11. The portable electronic device of claim 7, wherein the display comprises an LCD.

12. The portable electronic device of claim 7, wherein the processor executes code to subdivide the graphical user interface into rectangular blocks according to pixels defined by common layers.

13. The portable electronic device of claim 12, wherein the opaque view is redrawn during a transition from a first image to a subsequent image corresponding to a change in media content being provided to a user by the portable electronic device.

14. The portable electronic device of claim 12, wherein the opaque view is redrawn in response to input from a user.

15. A tangible machine readable medium comprising code configured to:
    generate a graphical user interface comprising multiple layers and views superimposed over a background layer, wherein at least one of the views is opaque, by drawing the multiple layers and views over the background layer from lowest to highest; and
    redraw the opaque view when the opaque view changes without redrawing portions of layers superimposed by the opaque view.

16. The tangible machine readable medium of claim 15 comprising code configured to redraw layers lower than the opaque view without redrawing the portions of the layers superimposed by the opaque view.

17. The tangible machine readable medium of claim 15 comprising code configured to subdivide the graphical user interface into rectangular tiles according to common pixel attributes.

18. A method for marking opaque views in a graphical user interface comprising:
    providing a graphical interface for an electronic device by drawing a background layer before drawing graphics layers over the background layer, wherein the graphics layers comprise at least one opaque view;
    subdividing the graphical user interface into tiles based on pixels sharing common layers;
    determining whether a tile comprises the at least one opaque view; and
    marking the tile as opaque so that portions of layers under the opaque view are not redrawn.

19. The method of claim 18 wherein the opaque tile comprises album art.

20. The method of claim 18 comprising redrawing the graphical user interface without redrawing the portions of layers under the opaque view.

21. The method of claim 18 wherein determining whether a tile comprises the at least one opaque view comprises determining an opacity value of the tile.

22. The method of claim 18 wherein the opaque view is redrawn by a fade in/out technique.

23. A method of rendering a graphical user interface in response to one refresh event comprising:
    drawing a background layer during the refresh event;
    drawing a first translucent graphics layer over at least a portion of the background layer during the refresh event;
    drawing an opaque view over at least a portion of the first translucent graphics layer during the refresh event;
    drawing at least a portion of a second translucent graphics layer over the opaque view during the refresh event; and
    when content in the opaque view changes:
        redrawing the opaque view without redrawing the portion of the first translucent graphics layer under the opaque view; and
        redrawing at least the portion of the second translucent graphics layer over the opaque view.

24. The method of claim 23, wherein, when content changes in a portion of the first translucent graphics layer that is entirely obscured by the opaque view, the portion of the first translucent graphics layer that is entirely obscured by the opaque view is not redrawn.

* * * * *